United States Patent
Tarnopolsky et al.

(10) Patent No.: US 6,601,471 B2
(45) Date of Patent: *Aug. 5, 2003

(54) MAIN BLOCK OF DROP-POWER STATION

(76) Inventors: Mikhail Tarnopolsky, 7110 Ridge Ct., Brooklyn, NY (US) 11209; Galina Tarnopolsky, 7110 Ridge Ct., Brooklyn, NY (US) 11209

( * ) Notice: Subject to any disclaimer, the term of this patent is extended or adjusted under 35 U.S.C. 154(b) by 0 days.

This patent is subject to a terminal disclaimer.

(21) Appl. No.: 09/998,984

(22) Filed: Dec. 3, 2001

(65) Prior Publication Data

US 2003/0101845 A1 Jun. 5, 2003

(51) Int. Cl.[7] .................. F16H 33/02; F16H 33/08; G05G 1/00; G05G 3/00
(52) U.S. Cl. ................. 74/573 R; 74/572; 74/64; 74/63; 74/DIG. 9; 185/27
(58) Field of Search ................. 74/64, 63, 61, 74/DIG. 9, 572–574; 185/27, 29

(56) References Cited

U.S. PATENT DOCUMENTS

| | | | | |
|---|---|---|---|---|
| 1,767,311 A | * | 6/1930 | Rohrbacher | 185/27 |
| 1,791,386 A | * | 2/1931 | Sprigg | 74/64 |
| 3,750,484 A | * | 8/1973 | Benjamin | 74/84 S |
| 4,438,656 A | * | 3/1984 | Hayer | 74/63 |
| 5,024,637 A | * | 6/1991 | Guichard | 475/166 |
| 5,667,038 A | * | 9/1997 | Tarnopolsky | 185/27 |
| 5,921,133 A | * | 7/1999 | Tarnopolsky | 74/64 |
| 6,109,123 A | * | 8/2000 | Baskis et al. | 74/89.1 |
| 6,363,804 B1 | * | 4/2002 | Tarnopolsky | 74/64 |

FOREIGN PATENT DOCUMENTS

| | | | | |
|---|---|---|---|---|
| JP | 5-296138 | * | 11/1993 | 74/64 |
| JP | 11-173255 | * | 6/1999 | 74/64 |

* cited by examiner

*Primary Examiner*—Vinh T. Luong
(74) *Attorney, Agent, or Firm*—Steven Horowitz

(57) ABSTRACT

Four similar gravitational sub-systems connected with one another to keep rotational energy substantially constant caused by gravity as a result of the combined interaction between two elements having different groups of gravity masses and different speeds.

4 Claims, 10 Drawing Sheets

MAIN BLOCK OF DROP-POWER STATION

BACKGROUND

The present invention claims priority from U.S. patent application Ser. No. 09/998,984 which is based on and incorporates U.S. patent application Ser. No. 08/543,905 and is a continuation of and incorporates pending U.S. patent application Ser. No. 09/292,231 filed Mar. 30, 1999, which includes the Declaration filed in that case pursuant to 37 C.F.R. section 1.132.

The present invention utilizes the certain interaction between two specific unbalanced freely rotating sub-systems, each of which taken alone converts gravitational energy into mechanical energy using the method and system described in U.S. Pat. No. 5,921,133.

The present invention is a logical completion of this patent and incorporates this patent by reference. Here is a quotation from the U.S. Pat. No. 5,921,133 (see col.2, lines 9–16): "the process of obtaining a certain special unbalance includes certain steps to find the proper place and correct masses for them to make the free-falling rotation more powerful". This patent states that each of the "unbalanced masses 2,9 can represent many different unbalanced masses".

Following that method the applicants experimented to find the proper placement and weight of a collection of unbalanced masses placed on the sub-systems. The objective was to find such locations and amounts of the masses such that the sub-systems, having a certain relation to each other, would have kinetic energy to continue to rotate with substantially constant speed:

The present invention is a first step for a large-scale production of real clean energy.

SUMMARY OF THE INVENTION

Accordingly, it is an object to provide a new way for a "Main block of drop-power station".

In keeping with this way and with others, which will become apparent hereinafter, another feature of the present invention resides, briefly stated, in a main block of a drop-power station for producing energy by means of the certain interaction between four similar sub-systems (two opposite blocks), each of which taken alone converts gravitational energy into mechanical energy and each of which has a first rotatable specific unbalanced element and a second rotatable specific unbalanced element.

The first rotatable specific unbalanced element has thereon a gear periphery 8A and the first group of unbalanced masses having the values of 6 units of mass, 4 units of mass, 3 units of mass, spaced equidistantly on a circle with a certain radius having the value of 75 units of length.

The second rotatable element has thereon the system of local unbalanced masses in connecting with the gears and the second group of unbalanced masses having the values 5 units of mass, 3 units of mass, and 1 unit of mass spaced equidistantly on a circle with the same radius of rotation as the first group of unbalanced masses.

In the initial position of movement, the unbalanced masses having values of 6 uom and 5 uom located on the top of the main block symmetrical to the vertical axle with a 60 degree interval, while unbalanced masses having the values of 4 uom and 1 uom located on the bottom of the main block symmetrical to the vertical axle with a 60 degree interval.

Unbalanced masses having the value of 3 uom from the first group of unbalanced masses and 3 uom from the second group of unbalanced masses are located symmetrically on the horizontal axle with a radius having the value of 75 units of length.

As seen in FIG. 2, the first sub-system is referred to in shorthand as "S-S1", the second sub-system as "S-S2", the third sub-system as "S-S3" and the fourth sub-system as "S-S4".

In each sub-system taken alone the first (rotatable) element has a certain kinematic relation to the second (rotatable) element and they are connected to one another by means of a central overrunning clutch and gears spaced equidistantly on the periphery of the second element, having a local unbalanced mass on each gear as its source of power, said local unbalanced mass having an axle attached therethrough and connect to each gear by means of a local overrunning clutch.

The local unbalanced masses as a system is balanced, so that in each sub-system taken alone, the first rotatable element is powered by the first group of unbalanced masses, by the second group of unbalanced masses, and by sequential impulses of force that are generated as result of a rotation of the local unbalanced masses around their respective axles and as a result of the constant rotational separation of the second group of unbalanced masses from the first group of unbalanced masses.

Said sequential impulses of force and a particular configuration of positions and amount of the unbalanced masses cause said first rotatable element to rotate with increasing speed during the first half of a rotational cycle of said rotatable element and with decreasing speed during the second half of the rotational cycle of said first rotatable element.

In each sub-system taken alone, the second rotatable element is powered by the second group of unbalanced masses, by the first group of unbalanced masses, by sequential impulses of force that are generated as a result of a rotation of the local unbalanced masses around their respective axles and as a result of the constant rotational separation of the second group of unbalanced masses and by means of the gears.

The second element rotates slower then the first one and undergoes five revolutions in the period of time that the first element rotates through six revolutions; there being six revolutions in a single cycle.

The action of a local unbalanced element 7, which makes the first element turn faster that the second element, combined with a certain interaction between two specific groups of gravity masses acting on the rotatable elements, provide for each sub-system a certain changeable relationship between the magnitude of the speed of rotation of the rotatable elements of one sub-system and the magnitude of the speed of rotation of the rotatable elements of another sub-system and as a result a positive sum of driving moments in any interval of movement, and which is sufficient to increase power during the first three revolutions and to decrease power during the second three revolutions of a cycle, but not to an amount that is lower than the power of the initial position.

Each sub-system taken alone has an ability to continue to rotate due to the 148 units of kinetic energy by the end of each interval of movement, which is the same as a potential energy in the initial position of movement.

The combining of each of two sub-systems taken alone in a way that the certain frictional interaction between their second rotatable elements occurs at the connection between these element and the fact that a certain interaction between two specific groups of gravity masses occurs at the connection inside them causes the second elements to begin to operate at the same time and enhance each other's ability to provide a stable six revolution cycle of free rotation.

The first element of the second sub-system and the first element of the fourth sub-system are connected by means of their friction disks that provide sufficient friction between them so that movement of the first element of the second sub-system causes the first element of the fourth subsystem to move when the third and fourth sub-systems are released from an initial position.

The third and the fourth sub-systems as a second block begin to operate and interact with the first and the second sub-systems as a first block after duration of one-half of the rotational cycle of the first rotational element. That one-half of the rotational cycle of the first rotational element occurs with increasing velocity.

The interaction between two similar opposite blocks when the increase and decrease in the velocity of one of them is counteracted by a decrease or increase in the velocity of the second one provides a free rotation with a substantially constant velocity.

The invention itself, however, will best be understood from the following description of a preferred embodiment, which is accompanied by the following drawings.

BRIEF DESCRIPTION OF THE DRAWINGS

FIG. 4 is a diagram of combined interaction between two similar sub-systems.

FIG. 10a shows three unbalanced masses of specific weights on each rotatable element after at an interval of 30 rotational degrees of the first rotatable element following the position shown in FIG. 4a.

DESCRIPTION OF THE PREFERRED EMBODIMENT

Figure 1:
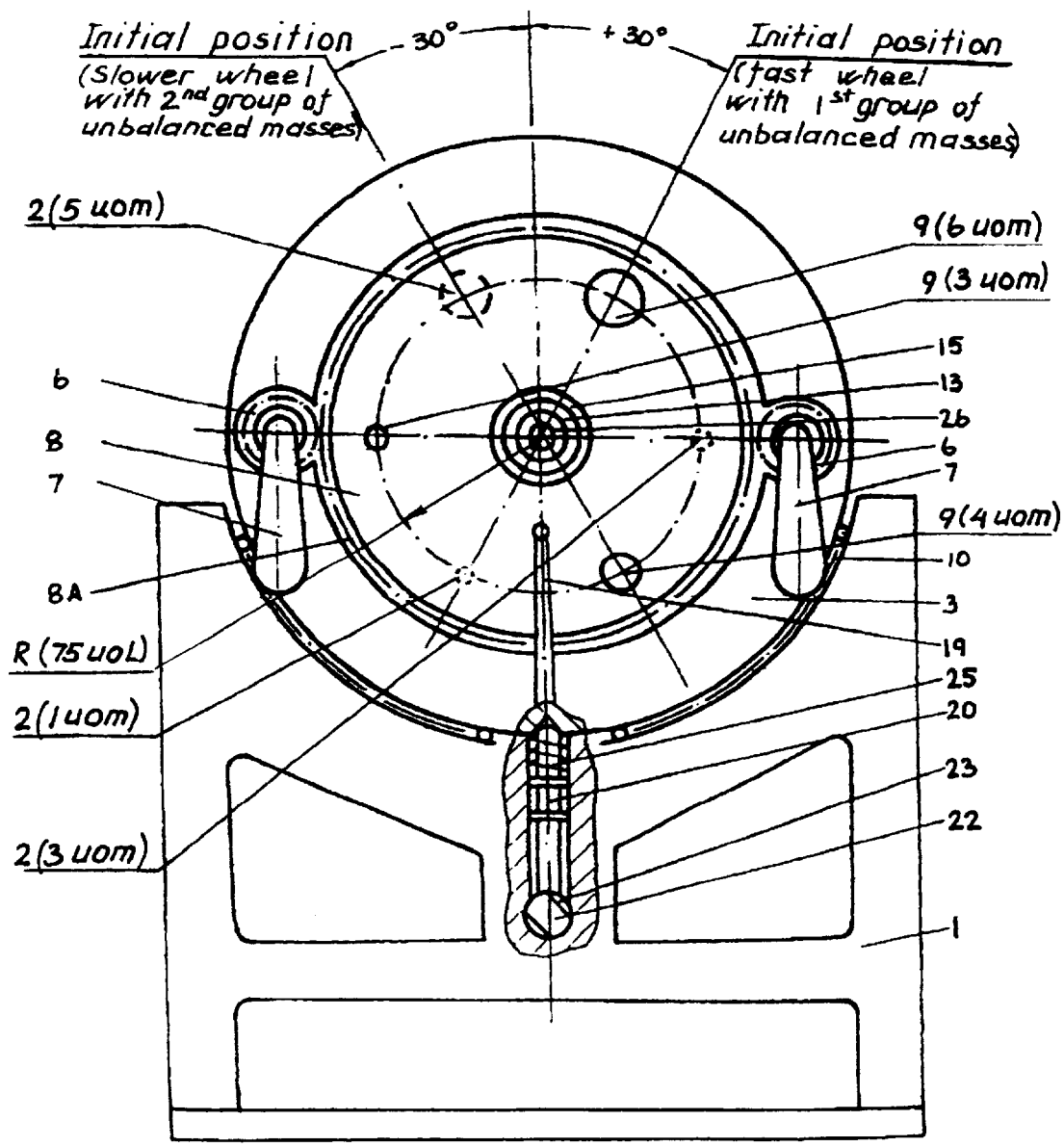
FIG. 1 is a front view of a schematic representation of a main block of drop-power station.
Figure 2:
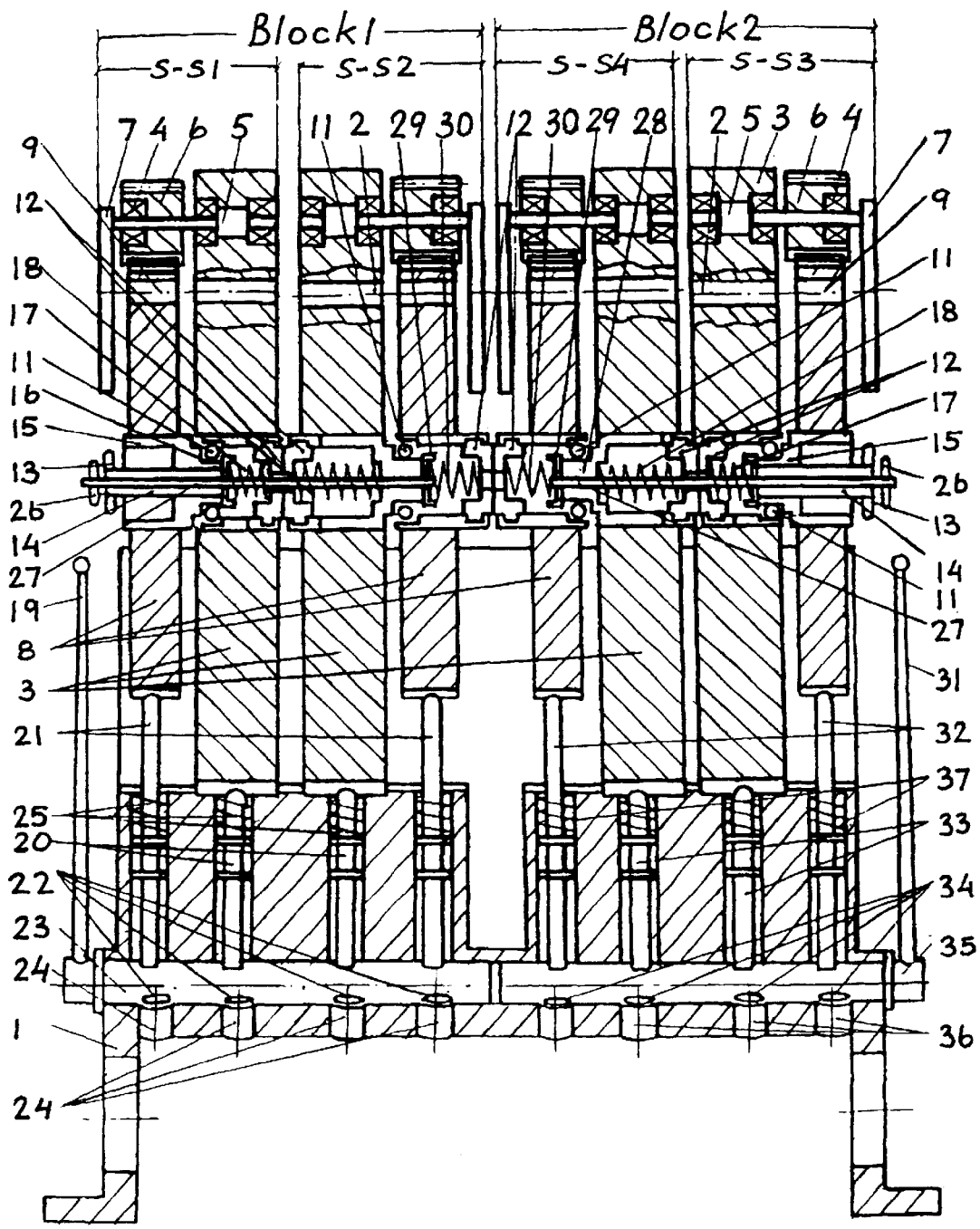
FIG. 2 is a side view of the system shown in FIG. 1.

The main block of drop-power station includes four similar sub-systems (two opposite blocks), which are based on a support 1 with bearing 10, as seen in FIG. 1 and FIG. 2.

Each sub-system taken alone has specific unbalanced wheels 3 and 8.

The term "gravity" used herein refers to the gravitational attraction between physical bodies due to mass rather than referring to the gravitation attraction at the surface of a celestial body.

The specific unbalanced wheel 8 has thereon a gear periphery 8A and the first group of unbalanced masses 9 having the values of 6 units of mass, 4 units of mass and 3 units of mass, which are in the initial position of movement spaced equidistantly on a circle with a radius having the value of 75 units of length according to the "1 O'clock", "5 O'clock" and "9 O'clock" positions.

The specific unbalanced wheel 3 has thereon the system of gravitational levers 7, which is balanced (the levers together balance each other so that the system as a whole is balanced), while each of the levers taken alone is unbalanced (the lever is therefore a local unbalanced mass, sometimes also called a local unbalanced element). In addition, wheel 3 has thereon the second group of unbalanced masses 2 having the values 5 units of mass, 3 units of mass and 1 unit of mass, which are, in the beginning of the movement of the wheel 3, spaced equidistantly on a circle with a radius having a value of 75 units of length. Accordingly, this second group of masses 2 are positioned on the circle at the "11 O'clock", "3 O'clock" and "7 O'clock" positions. As can be seen from their differing units of mass and locations, the unbalanced masses 2 are unbalanced even taken together as a group (in terms of the forces they cause), which is why they are not called local unbalanced masses.

In each sub-system taken alone the wheel 8 has a certain kinematic relation to the wheel 3 and they are connected to one another by means of a central overrunning clutch 11 and gears 6 spaced equidistantly on the periphery of the wheel 3, having lever 7 on each gear as its source of power.

In each sub-system taken alone, the wheel 8 is powered by the first group of unbalanced masses 9, by the second group of unbalanced masses 2, and by sequential impulses of force that are generated as a result of a rotation of the gravitational lever 7, which makes wheel 8 turn faster ans hence more frequently than wheel 3.

The acronym "GL" means gravitational lever.

The short shoulder of "GL" is the radius of the gear 6, which is connected to a gear periphery 8A of wheel 8. The "GL" has an axle 5 attached therethrough and connected to each gear 6 by means of overrunning clutch 4. From the point of view of the motionless system, the "GL" works as a well-known Archimed Lever, according to which the power and distance are self-balanced. The amount gained in power is equivalent to the amount lost in distance.

From the point of view of the rotating System the picture globally changes, when the wheels start moving powered by its own gravity masses.

In this case the outer force on the long shoulder of the "GL" is the long shoulder itself, because it tends to keep itself vertical, due to the gravitation. This tendency itself is a description of how the "GL" works.

The size of the longer shoulder can be increased as much as one wants. And this will increase the "GL" power, but wouldn't cause a decrease in the distance, because the shorter shoulder duplicates the movements of the longer one.

This is independent of the length of the long shoulder. When the "GL" makes one full turn around a general axis (axis of a rotation system) the short shoulder also makes one full turn around its own axis (not less and not more).

It means that "GL" gains in distance, but it doesn't lose in power, because it power is gravitation.

Figure 3A:
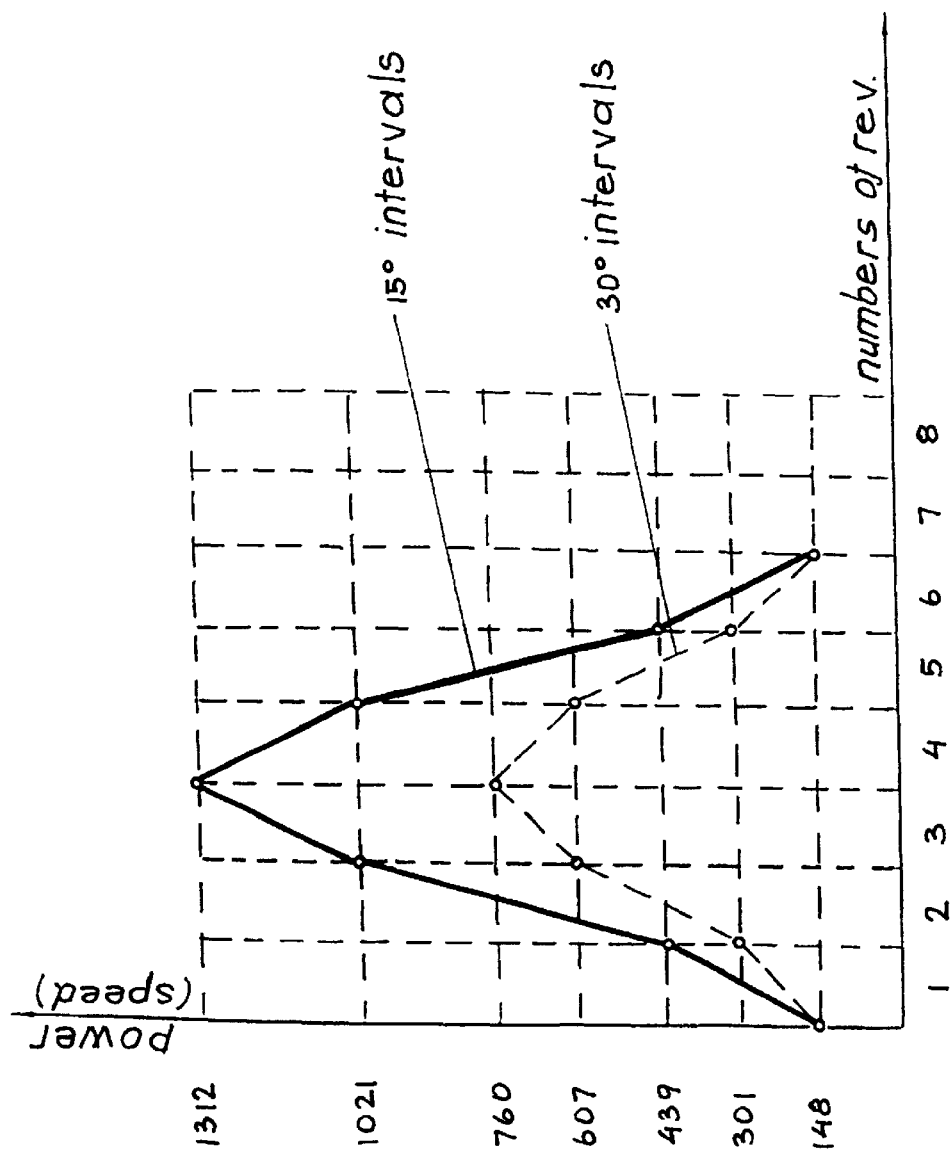
FIG. 3a. is a diagram of the interaction between two specific unbalanced group of gravity masses in a sub-system taken alone.
Figure 3B:
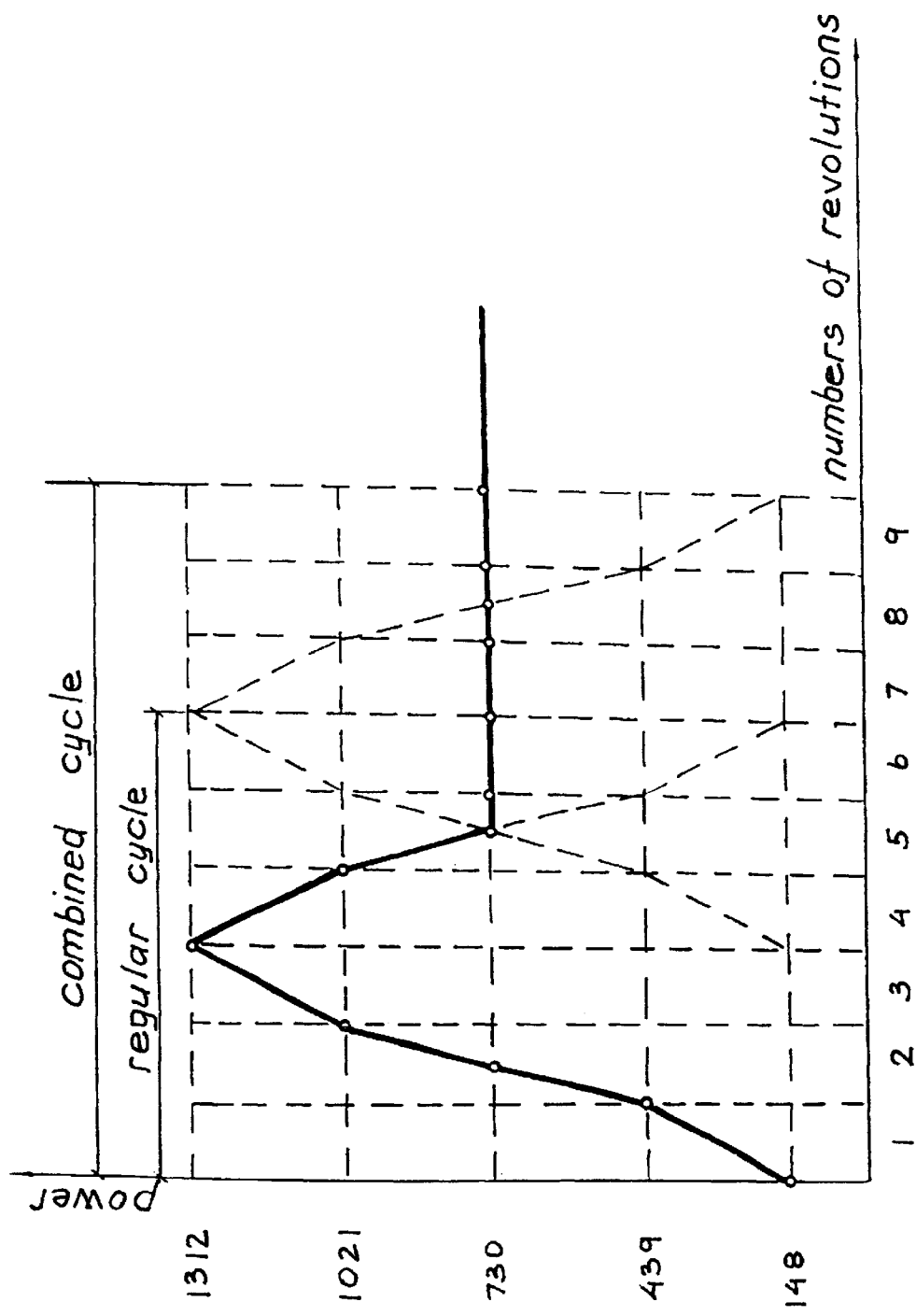
FIG. 3b. is a diagram of interaction between gravity masses in 15 degree, 30 degree and 60 degree intervals of movement.
Figure 4A:
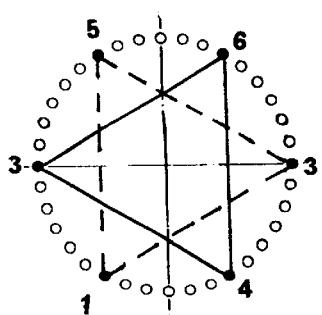
FIG. 4a shows three unbalanced masses of specific weights on each rotatable element at an initial position of the rotatable elements.
Figure 4E:
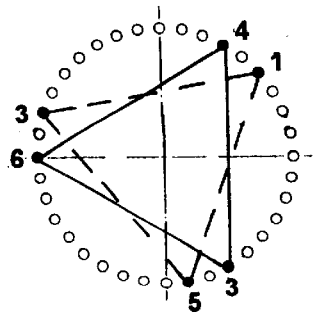
FIG. 4e shows three unbalanced masses of specific weights on each rotatable element after at a further interval of 60 rotational degrees of the first rotational element.
Figure 5C:
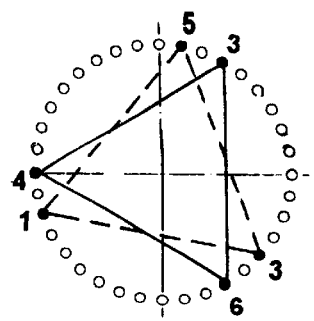
FIG. 5c shows three unbalanced masses of specific weights on each rotatable element after at a further interval of 60 rotational degrees of the first rotational element.
Figure 4B:
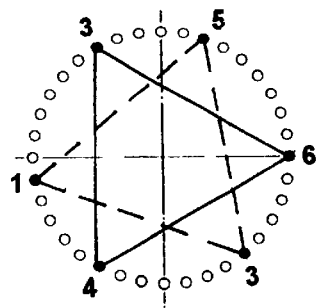
FIG. 4b shows three-unbalanced masses of specific weights on each rotatable element after at an interval of 60 rotational degrees of the first rotatable element.
Figure 4F:
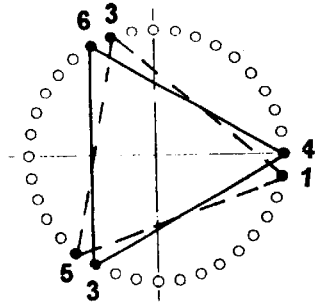
FIG. 4f shows three unbalanced masses of specific weights on each rotatable element after at a further interval of 60 rotational degrees of the first rotational element.
Figure 5D:
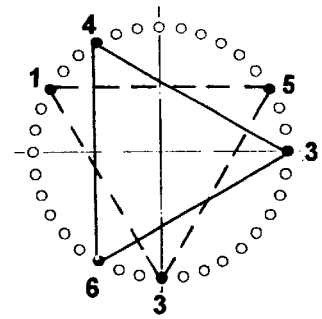
FIG. 5d shows three unbalanced masses of specific weights on each rotatable element after at a further interval of 60 rotational degrees of the first rotational element.
Figure 4C:
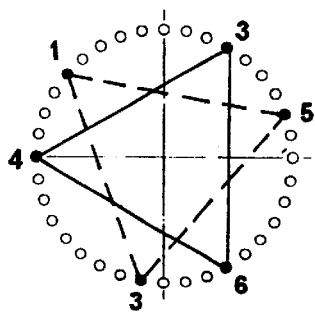
FIG. 4c shows three unbalanced masses of specific weights on each rotatable element after at a further interval of 60 rotational degrees of the first rotational element.
Figure 5A:
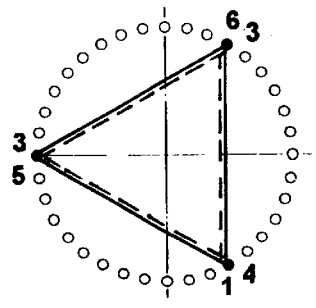
FIG. 5a shows three unbalanced masses of specific weights on each rotatable element after at a further interval of 60 rotational degrees of the first rotational element.
Figure 5E:
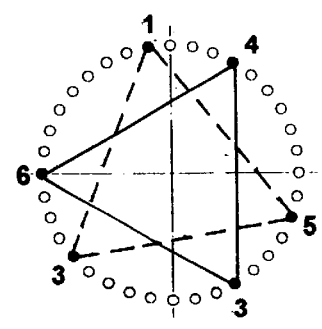
FIG. 5e shows three unbalanced masses of specific weights on each rotatable element after at a further interval of 60 rotational degrees of the first rotational element.
Figure 4D:
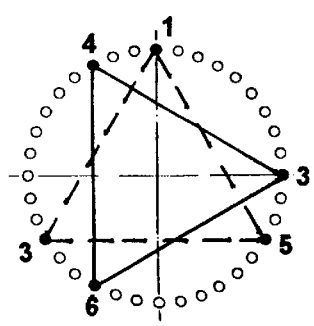
FIG. 4d shows three unbalanced masses of specific weights on each rotatable element after at a further interval of 60 rotational degrees of the first rotational element.
Figure 5B:
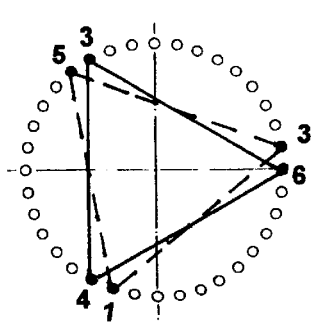
FIG. 5b shows three unbalanced masses of specific weights on each rotatable element after at a further interval of 60 rotational degrees of the first rotational element.
Figure 5F:
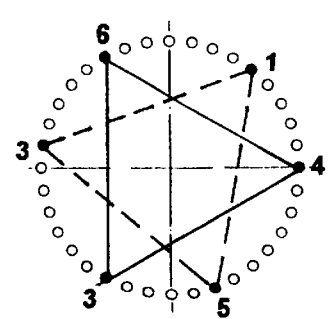
FIG. 5f shows three unbalanced masses of specific weights on each rotatable element after at a further interval of 60 rotational degrees of the first rotational element.
Figure 6A:
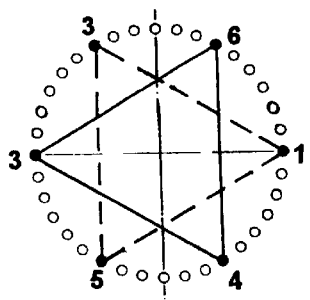
FIG. 6a shows three unbalanced masses of specific weights on each rotatable element after at a further interval of 60 rotational degrees of the first rotational element.
Figure 6E:
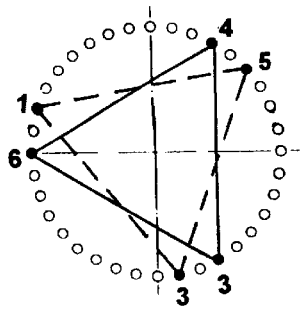
FIG. 6e shows three unbalanced masses of specific weights on each rotatable element after at a further interval of 60 rotational degrees of the first rotational element.
Figure 7C:
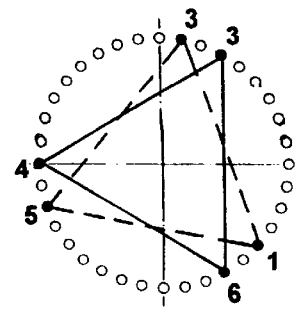
FIG. 7c shows three unbalanced masses of specific weights on each rotatable element after at a further interval of 60 rotational degrees of the first rotational element.
Figure 6B:
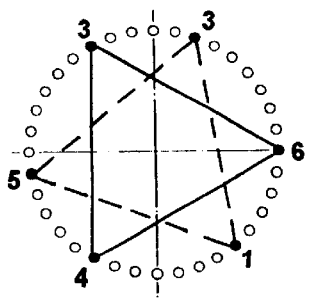
FIG. 6b shows three unbalanced masses of specific weights on each rotatable element after at a further interval of 60 rotational degrees of the first rotational element.
Figure 6F:
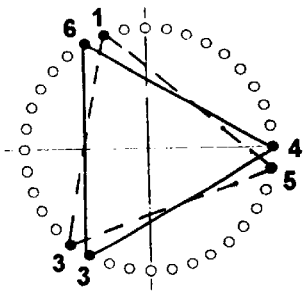
FIG. 6f shows three unbalanced masses of specific weights on each rotatable element after at a further interval of 60 rotational degrees of the first rotational element.
Figure 7D:
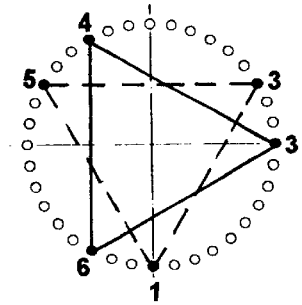
FIG. 7d shows three unbalanced masses of specific weights on each rotatable element after at a further interval of 60 rotational degrees of the first rotational element.
Figure 6C:
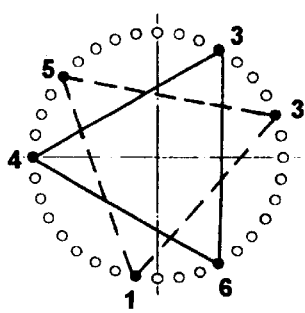
FIG. 6c shows three unbalanced masses of specific weights on each rotatable element after at a further interval of 60 rotational degrees of the first rotational element.
Figure 7A:
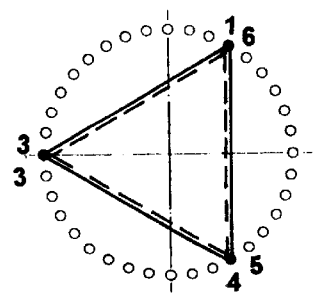
FIG. 7a shows three unbalanced masses of specific weights on each rotatable element after at a further interval of 60 rotational degrees of the first rotational element.
Figure 7E:
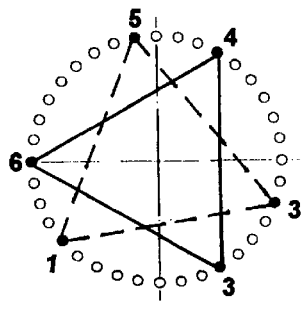
FIG. 7e shows three unbalanced masses of specific weights on each rotatable element after at a further interval of 60 rotational degrees of the first rotational element.
Figure 6D:
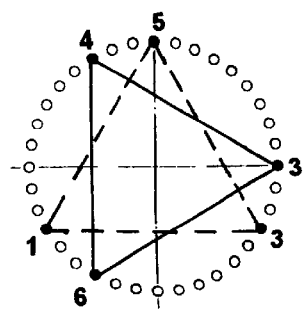
FIG. 6d shows three unbalanced masses of specific weights on each rotatable element after at a further interval of 60 rotational degrees of the first rotational element.
Figure 7B:
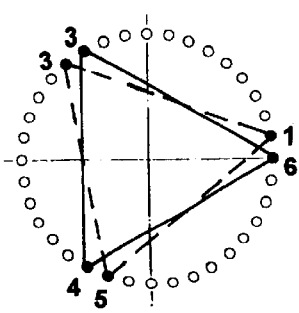
FIG. 7b shows three unbalanced masses of specific weights on each rotatable element after at a further interval of 60 rotational degrees of the first rotational element.
Figure 7F:
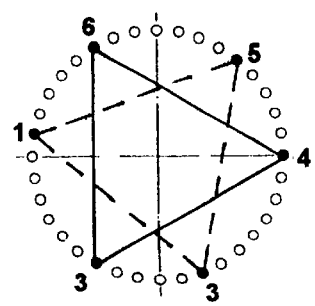
FIG. 7f shows three unbalanced masses of specific weights on each rotatable element after at a further interval of 60 rotational degrees of the first rotational element.
Figure 8A:
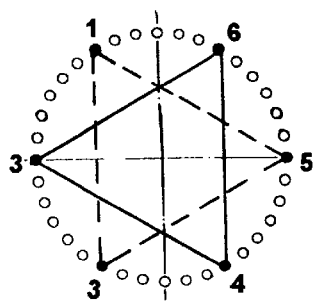
FIG. 8a shows three unbalanced masses of specific weights on each rotatable element after at a further interval of 60 rotational degrees of the first rotational element.
Figure 8E:
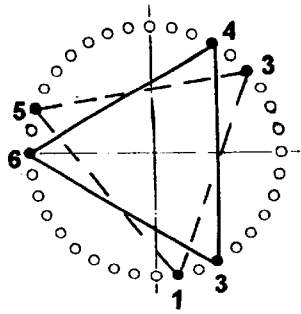
FIG. 8e shows three unbalanced masses of specific weights on each rotatable element after at a further interval of 60 rotational degrees of the first rotational element.
Figure 9C:
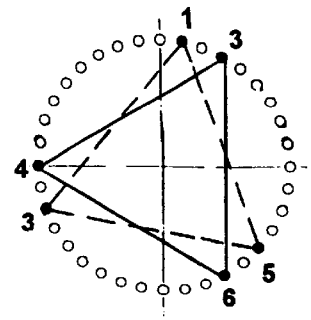
FIG. 9c shows three unbalanced masses of specific weights on each rotatable element after at a further interval of 60 rotational degrees of the first rotational element.
Figure 8B:
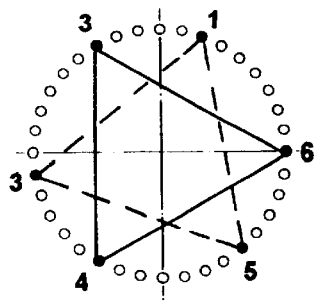
FIG. 8b shows three unbalanced masses of specific weights on each rotatable element after at a further interval of 60 rotational degrees of the first rotational element.
Figure 8F:
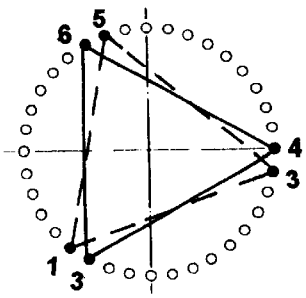
FIG. 8f shows three unbalanced masses of specific weights on each rotatable element after at a further interval of 60 rotational degrees of the first rotational element.
Figure 9D:
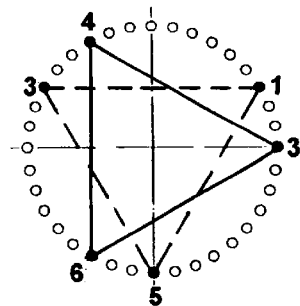
FIG. 9d shows three unbalanced masses of specific weights on each rotatable element after at a further interval of 60 rotational degrees of the first rotational element.
Figure 8C:
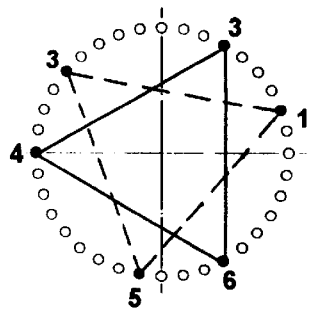
FIG. 8c shows three unbalanced masses of specific weights on each rotatable element after at a further interval of 60 rotational degrees of the first rotational element.
Figure 9A:
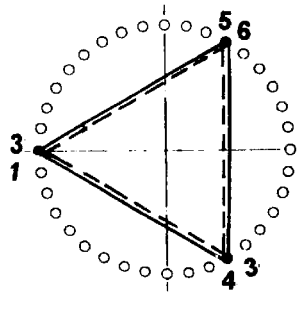
FIG. 9a shows three unbalanced masses of specific weights on each rotatable element after at a further interval of 60 rotational degrees of the first rotational element.
Figure 9E:
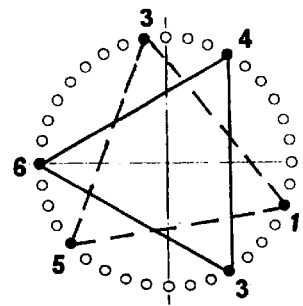
FIG. 9e shows three unbalanced masses of specific weights on each rotatable element after at a further interval of 60 rotational degrees of the first rotational element.
Figure 8D:
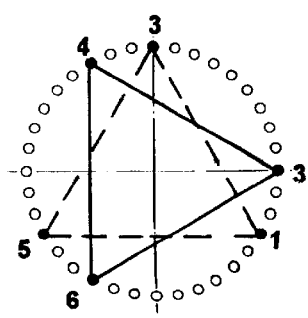
FIG. 8d shows three unbalanced masses of specific weights on each rotatable element after at a further interval of 60 rotational degrees of the first rotational element.
Figure 9B:
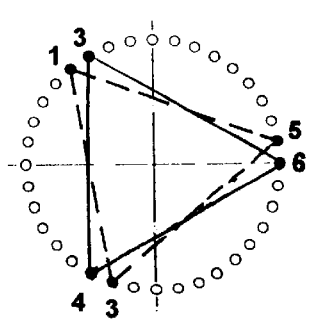
FIG. 9b shows three unbalanced masses of specific weights on each rotatable element after at a further interval of 60 rotational degrees of the first rotational element.
Figure 9F:
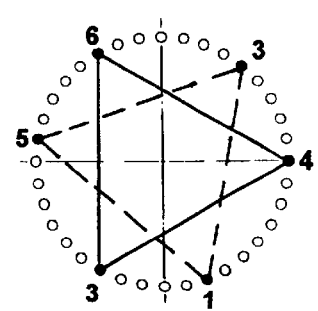
FIG. 9f shows three unbalanced masses of specific weights on each rotatable element after at a further interval of 60 rotational degrees of the first rotational element.
Figure 10A:
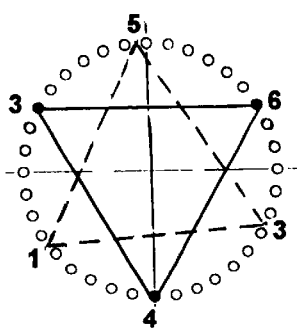
Figure 10E:
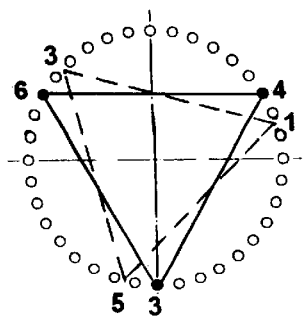
FIG. 10e shows three unbalanced masses of specific weights on each rotatable element after at a further interval of 30 rotational degrees of the first rotational element.
Figure 11C:
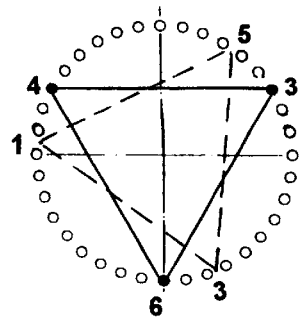
FIG. 11c shows three unbalanced masses of specific weights on each rotatable element after at a further interval of 30 rotational degrees of the first rotational element.
Figure 10B:
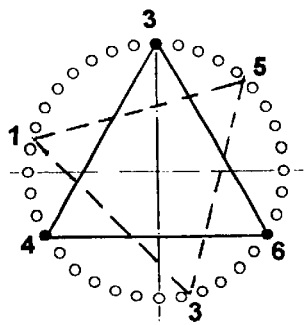
FIG. 10b shows three unbalanced masses of specific weights on each rotatable element after at a further interval of 30 rotational degrees of the first rotational element.
Figure 10F:
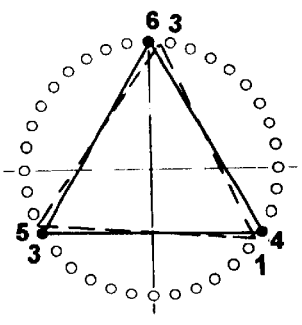
FIG. 10f shows three unbalanced masses of specific weights on each rotatable element after at a further interval of 30 rotational degrees of the first rotational element.
Figure 11D:
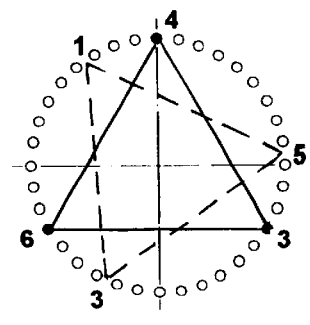
FIG. 11d shows three unbalanced masses of specific weights on each rotatable element after at a further interval of 30 rotational degrees of the first rotational element.
Figure 10C:
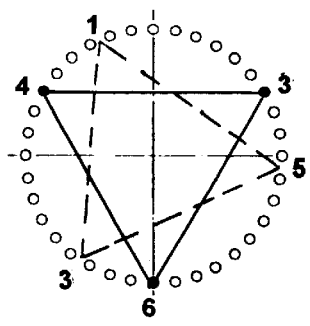
FIG. 10c shows three unbalanced masses of specific weights on each rotatable element after at a further interval of 30 rotational degrees of the first rotational element.
Figure 11A:
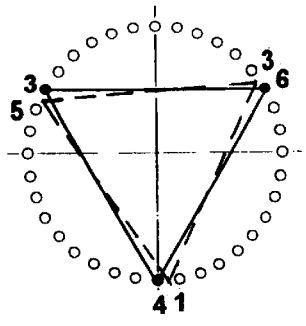
FIG. 11a shows three unbalanced masses of specific weights on each rotatable element after at a further interval of 30 rotational degrees of the first rotational element.
Figure 11E:
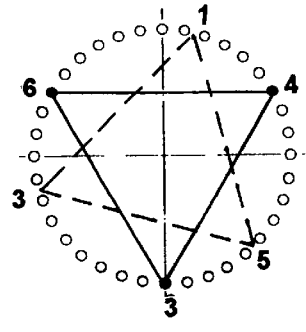
FIG. 11e shows three unbalanced masses of specific weights on each rotatable element after at a further interval of 30 rotational degrees of the first rotational element.
Figure 10D:
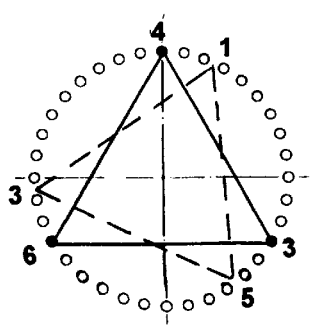
FIG. 10d shows three unbalanced masses of specific weights on each rotatable element after at a further interval of 30 rotational degrees of the first rotational element.
Figure 11B:
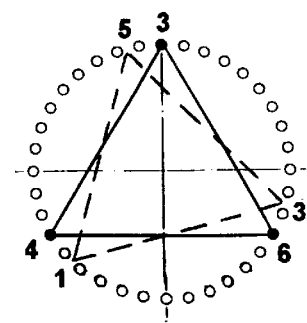
FIG. 11b shows three unbalanced masses of specific weights on each rotatable element after at a further interval of 30 rotational degrees of the first rotational element.
Figure 11F:
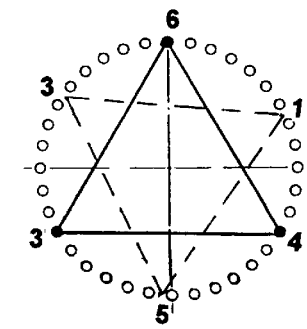
FIG. 11f shows three unbalanced masses of specific weights on each rotatable element after at a further interval of 30 rotational degrees of the first rotational element.
Figure 12A:
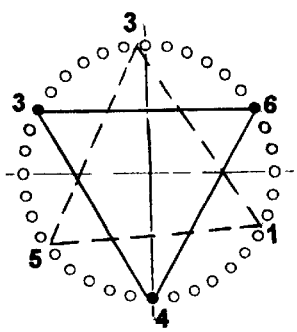
FIG. 12a shows three unbalanced masses of specific weights on each rotatable element after at a further interval of 30 rotational degrees of the first rotational element.
Figure 12E:
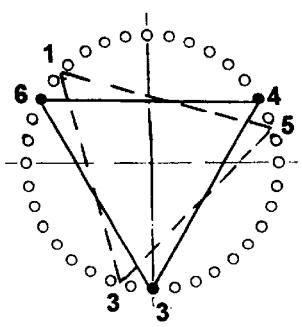
FIG. 12e shows three unbalanced masses of specific weights on each rotatable element after at a further interval of 30 rotational degrees of the first rotational element.
Figure 13C:
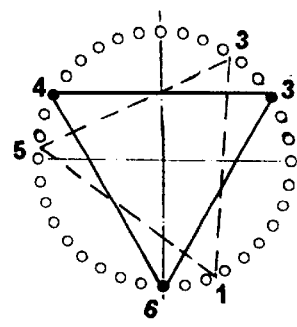
FIG. 13c shows three unbalanced masses of specific weights on each rotatable element after at a further interval of 30 rotational degrees of the first rotational element.
Figure 12B:
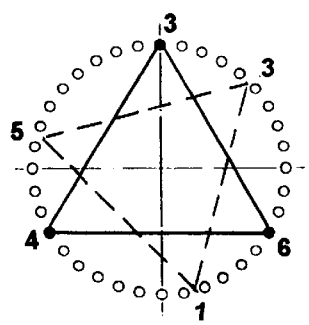
FIG. 12b shows three unbalanced masses of specific weights on each rotatable element after at a further interval of 30 rotational degrees of the first rotational element.
Figure 12F:
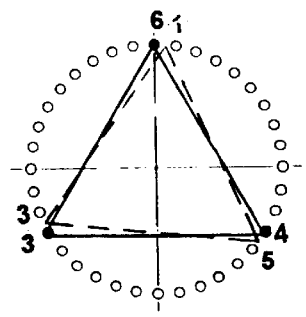
FIG. 12f shows three unbalanced masses of specific weights on each rotatable element after at a further interval of 30 rotational degrees of the first rotational element.
Figure 13D:
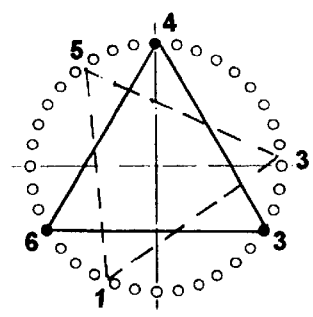
FIG. 13d shows three unbalanced masses of specific weights on each rotatable element after at a further interval of 30 rotational degrees of the first rotational element.
Figure 12C:
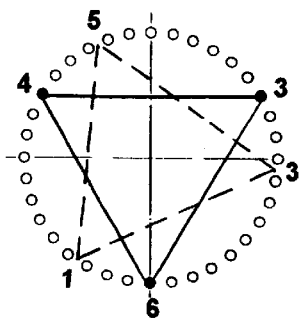
FIG. 12c shows three unbalanced masses of specific weights on each rotatable element after at a further interval of 30 rotational degrees of the first rotational element.
Figure 13A:
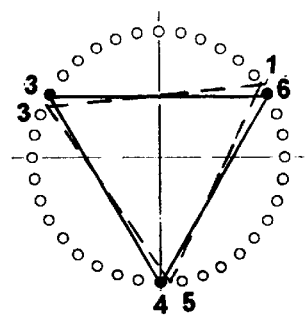
FIG. 13a shows three unbalanced masses of specific weights on each rotatable element after at a further interval of 30 rotational degrees of the first rotational element.
Figure 13E:
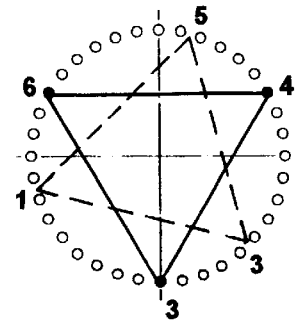
FIG. 13e shows three unbalanced masses of specific weights on each rotatable element after at a further interval of 30 rotational degrees of the first rotational element.
Figure 12D:
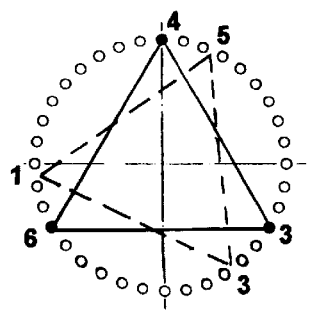
FIG. 12d shows three unbalanced masses of specific weights on each rotatable element after at a further interval of 30 rotational degrees of the first rotational element.
Figure 13B:
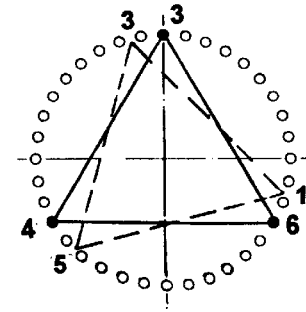
FIG. 13b shows three unbalanced masses of specific weights on each rotatable element after at a further interval of 30 rotational degrees of the first rotational element.
Figure 13F:
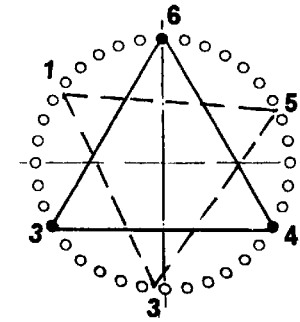
FIG. 13f shows three unbalanced masses of specific weights on each rotatable element after at a further interval of 30 rotational degrees of the first rotational element.
Figure 14A:
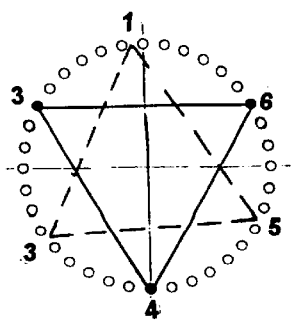
FIG. 14a shows three unbalanced masses of specific weights on each rotatable element after at a further interval of 30 rotational degrees of the first rotational element.
Figure 14E:
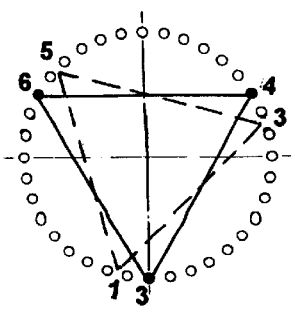
FIG. 14e shows three unbalanced masses of specific weights on each rotatable element after at a further interval of 30 rotational degrees of the first rotational element.
Figure 15C:
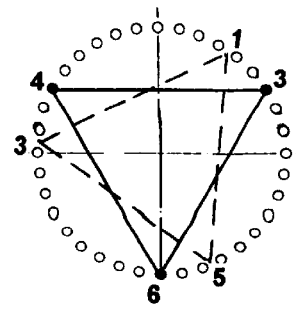
FIG. 15c shows three unbalanced masses of specific weights on each rotatable element after at a further interval of 30 rotational degrees of the first rotational element.
Figure 14B:
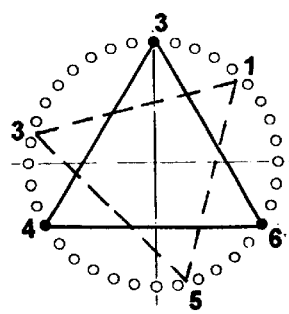
FIG. 14b shows three unbalanced masses of specific weights on each rotatable element after at a further interval of 30 rotational degrees of the first rotational element.
Figure 14F:
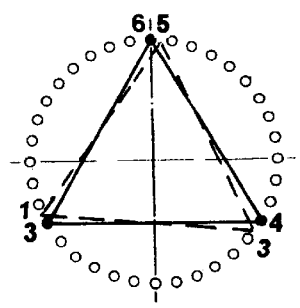
FIG. 14f shows three unbalanced masses of specific weights on each rotatable element after at a further interval of 30 rotational degrees of the first rotational element.
Figure 15D:
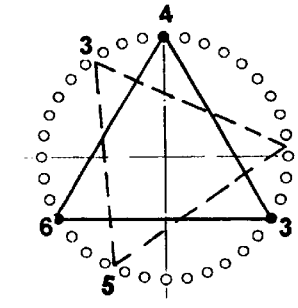
FIG. 15d shows three unbalanced masses of specific weights on each rotatable element after at a further interval of 30 rotational degrees of the first rotational element.
Figure 14C:
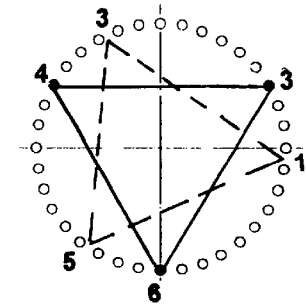
FIG. 14c shows three unbalanced masses of specific weights on each rotatable element after at a further interval of 30 rotational degrees of the first rotational element.
Figure 15A:
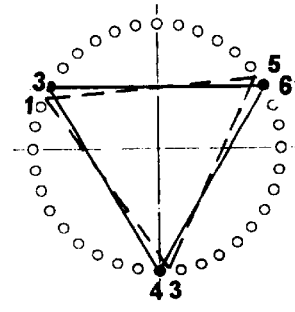
FIG. 15a shows three unbalanced masses of specific weights on each rotatable element after at a further interval of 30 rotational degrees of the first rotational element.
Figure 15E:
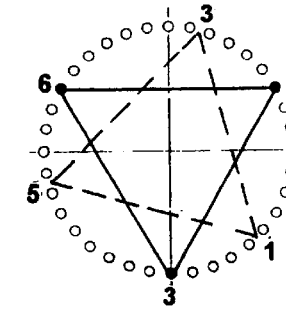
FIG. 15e shows three unbalanced masses of specific weights on each rotatable element after at a further interval of 30 rotational degrees of the first rotational element.
Figure 14D:
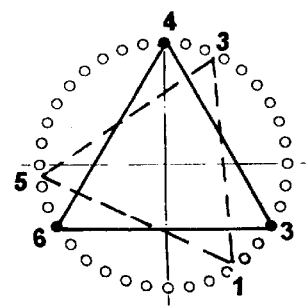
FIG. 14d shows three unbalanced masses of specific weights on each rotatable element after at a further interval of 30 rotational degrees of the first rotational element.
Figure 15B:
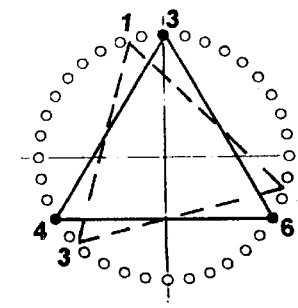
FIG. 15b shows three unbalanced masses of specific weights on each rotatable element after at a further interval of 30 rotational degrees of the first rotational element.
Figure 15F:
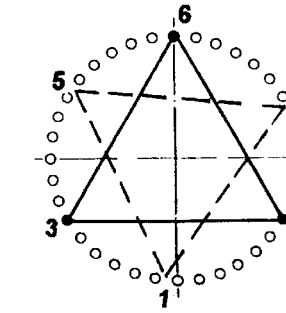
FIG. 15f shows three unbalanced masses of specific weights on each rotatable element after at a further interval of 30 rotational degrees of the first rotational element.

The action of a lever 7, which makes the wheel 8 turn faster than wheel 3 combine with a certain interaction between two specific groups of gravity masses 9 and 2 acting on the wheels provide for each sub-system taken alone a certain changeable relationship between them and as a result a positive sum of driving moments, which is bigger than the negative sum of driving moments in any intervals of movement, and which is sufficient to increase speed during the first three revolutions and to decrease speed during the second three revolutions of a cycle (see table 1–3, FIG. 3a).

What is claimed is:

1. A main block of a drop-power station, comprising:

four similar sub-systems, each of which taken alone converts gravity into mechanical energy by means of a sequence of impulses of force and each of which has a first rotatable element and a second rotatable element, the first rotatable element being a first rotatable specific unbalanced element, said first rotatable specific unbalanced element having thereon a gear periphery and a first group of unbalanced masses that have values of 6 units of mass, 4 units of mass and 3 units of mass, said first group of unbalanced masses, in a beginning of movement of the first rotatable element, spaced equidistantly on a circle that has a radius of 75 units of length at a "1 o'clock", a "5 o'clock" and a "9'o'clock" positions respectively, the second rotatable element having thereon the system of local unbalanced masses connected to gears and the second group of unbalanced masses having the values 5 units of mass, 3 units of mass, and 1 unit of mass, said second group of unbalanced masses, in a beginning of movement of the first rotatable element, spaced equidistantly on said circle of 75 units of length at "11 o'clock", a "3 o'clock" and a "7'o'clock" positions respectively, in each sub-system taken alone the first rotatable element has a kinematic relation to the second rotatable element and the first and second rotatable elements are connected to one another by means of a central overrunning clutch and by means of gears spaced equidistantly on a periphery of the second rotatable element, said second rotatable element having a local unbalanced mass on each gear as its source of power, said local unbalanced mass having an axle attached therethrough and connected to each gear by means of a local overrunning clutch, the local unbalanced masses taken together being balanced, so that in each sub-system taken alone, the first rotatable element is powered by the first group of unbalanced masses, by the second group of unbalanced masses, and by sequential impulses of force that are generated as a result of a rotation of the local unbalanced masses around their respective axles and a result of a constant rotational separation of the second group of unbalanced masses, said sequential impulses of force and a particular configuration of positions and amounts of the unbalanced masses causing said first rotatable element to rotate with increasing speed during a first half of a rotational cycle of said first rotatable element and with decreasing speed during a second half of the rotational cycle of said first rotational element, in each sub-system taken alone, the second rotatable element is powered by the second group of unbalanced masses, by the first group of unbalanced basses, by sequential impulses of force that are generated as a result of a rotation of the local unbalanced masses around their respective axles and as a result of the constant rotational separation of the second group of unbalanced masses from the first group of unbalanced masses and by means of the gears, the second rotatable element rotating slower than the first rotatable element and rotating through five revolutions in a period of time in which the first rotatable element rotates through six revolutions, there being six revolutions in a single cycle, the action of a local unbalanced mass, which makes the first rotatable element turn faster than the second rotatable element, combined with an interaction between two specific groups of gravity masses acting on the rotatable elements, provide for each sub-system a changeable relationship between a magnitude of a speed of rotation of the rotatable elements of one sub-system and a magnitude of the speed of rotation of the rotatable elements of another sub-system and as a result a positive sum of driving moments, which sum is larger than a negative sum of driving moments in any interval of movement, and which is sufficient to increase power during a first three revolutions and to decrease power during a second three revolutions of a cycle, but not lower that a power of an initial position, each sub-system taken alone having an ability to continue to rotate due to 148 units of kinetic energy by the end of each interval of movement, which is the same as a potential energy at an initial position of movement, a combining of each of two sub-systems taken alone in a way so that a frictional interaction between their second rotatable elements occurs at a connection between their second rotatable elements and in a way so that an interaction between specific groups of gravity masses occurs at the connection inside the first and second rotatable elements, said second rotatable elements beginning to operate at a same time and enhance each other's ability to provide a stable six revolution cycle of free rotation, the combining of each of the four sub-systems into two opposite blocks when a frictional interaction between the first rotatable elements of each of the four sub-systems occurring at a connection between the first rotatable elements and an interaction between two specific groups of gravity masses occurring at the connection inside the first and second rotatable elements, the third and fourth sub-systems as a second block beginning to operate and interact with the first and second sub-systems as a first block after a duration of one-half of the rotational cycle of the first rotatable elements when an increase or decrease in a velocity of one of said first rotatable elements is counteracted by a decrease or increase in the velocity of the second of said rotatable elements thereby providing free rotation to each sub-system.

2. The main block of a drop-power station of claim 1, wherein the first and second rotatable elements are wheels having certain and different speeds of rotation and having friction disks as a connection between sub-systems.

3. The main block of a drop-power station of claim 1, wherein the local unbalanced mass is a gravitational lever, which makes the first rotational element rotate faster than the second rotational element.

4. The main block of a drop-power station of claim 1, wherein the increase or decrease in the velocity of one of said first rotatable elements that is counteracted by the decrease or increase in the velocity of the second of said rotatable elements provides free rotation to each sub-system with a substantially constant velocity.

* * * * *